United States Patent [19]

Kithany

[11] Patent Number: 4,812,372
[45] Date of Patent: Mar. 14, 1989

[54] REFRACTORY METAL SUBSTRATE AND COATINGS THEREFOR

[75] Inventor: Subhash S. Kithany, Reynoldsburg, Ohio

[73] Assignee: Owens-Corning Fiberglas Corporation, Toledo, Ohio

[21] Appl. No.: 147,963

[22] Filed: Jan. 25, 1988

[51] Int. Cl.$^4$ .......................... B32B 15/01; C03B 5/42
[52] U.S. Cl. .......................................... 428/664; 65/1;
65/374.12; 219/69 E; 373/28; 373/30; 373/36; 420/429
[58] Field of Search ................. 420/429; 428/664, 666;
219/69 E; 65/1, 374.12; 373/28, 30, 36

[56] References Cited

U.S. PATENT DOCUMENTS

| | | | |
|---|---|---|---|
| 2,018,814 | 10/1935 | Smith | 65/374.12 |
| 2,144,250 | 1/1939 | Allen et al. | 428/664 |
| 2,304,297 | 12/1942 | Anton | 428/664 |
| 3,425,116 | 2/1969 | Crooks et al. | 420/429 |
| 3,479,161 | 11/1969 | Evans | 428/664 |
| 4,366,571 | 12/1982 | Palmquist | 373/30 |
| 4,668,262 | 5/1987 | Kithany | 428/664 |

FOREIGN PATENT DOCUMENTS 550648 12/1957 Canada .................. 420/429

OTHER PUBLICATIONS

Harwood, "Protecting Molybdenum at High Temperatures", Materials and Methods, Reinhold Publishing Corp., Dec. 1956.

Primary Examiner—L. Dewayne Rutledge
Assistant Examiner—Robert L. McDowell
Attorney, Agent, or Firm—Patrick P. Pacella; Ted C. Gillespie; Catherine B. Martineau

[57] ABSTRACT

A refractory metal substrate suitable for use in contact with an oxygen- or nitrogen-containing environment at a temperature greater than the oxidation or nitridation acceleration temperature of the substrate is disclosed. The refractory metal substrate comprises a refractory metal comprised of molybdenum and having a coating comprised of chromium metal. In an alternative embodiment the refractory metal can be an alloy comprised of in weight percent: from about 10 to about 20 chromium, from about 0 to about 5 alumina ($Al_2O_3$), from about 0 to about 1 yttria ($Y_2O_3$), from about 0 to about 0.5 titanium, from about 0 to about 0.1 zirconium, the balance being essentially molybdenum to make 100% of the composition; and, optionally having a coating of chromium metal.

4 Claims, 1 Drawing Sheet

REFRACTORY METAL SUBSTRATE AND COATINGS THEREFOR

TECHNICAL FIELD

This invention relates to coated refractory metal substrates and to a molybdenum/chromium alloy suitable for use as a refractory metal substrate. In one of its more specific aspects, this invention relates to the use of chromium metal coatings for protecting a chromium/molybdenum alloy refractory metal substrate from deterioration at extremely high temperatures because of contact with the atmosphere, particularly during a start up operation.

BACKGROUND OF THE INVENTION

When a furnace is operated for melting mineral materials having high melting points, such as glass, the furnace must be capable of withstanding the effects of different environments. In particular, the furnace must be able to withstand the environment (i.e., exposure to air or nitrogen) during the start up operation of the furnace wherein the temperature will gradually increase from room temperature to a high operating temperature, perhaps as high as 3000° F. At the high temperatures present in a glass melting furnace the glass attacks most materials, causing spalling and other forms of deterioration. Further, the start up operation often takes up to one week or more the furnace must be able to withstand this harsh environment. Also, the furnace must function efficiently at the high operating temperatures during the continuous melting operation.

In order to withstand the high operating temperatures, various parts of the furnace are normally made from refractory metals such as molybdenum, tungsten, titanium or zirconium. These refractory metals are mechanically and physically resistant to dimensional changes under the extreme temperature conditions of an operating glass melting furnace. It is especially desirable to have the electrodes of a glass melting furnace be made from these refractory metals. It is also desirable to have the furnace contain a wall made of a refractory metal in order to prevent contamination of the glass by deterioration of the refractory insulating brick wall.

During the start up operation of a glass melting furnace, however, the typical refractory metal experiences an environment which causes considerable deterioration. Normally, a glass furnace is started up by heating to a molten state a small amount of glass batch in the vicinity of a few of the electrodes. The power is then slowly increased to the electrodes and gradually the temperature, and the amount of the molten glass in the furnace, is increased. During this time, while the electrodes are being heated to nearly operational temperatures of about 3000° F. the electrodes are partially exposed to the environment in the furnace, rather than being covered up with molten glass. The electrodes or other furnace parts are therefore subjected to extremely rapid deterioration.

Several methods have been developed for avoiding deterioration of the refractory metal parts due to the start up environment. One of these methods is to provide either an inert gas, such as nitrogen or argon, or a reducing gas, such as methane or hydrogen, to provide a protective envelope around the electrode. Another method involves heating the glass with temporary electrodes and/or products of combustion while keeping the operating refractory metal electrode cool during the furnace heating period. For example, a water-cooled jacket is placed around the electrode during the time in which the molten glass is built up around the electrode. When the protective water-cooled jacket is removed, the electrode experiences only molten glass and is not exposed to the atmosphere. However, these methods require extra equipment in the way of additional start up electrodes, or require somewhat complicated procedures, such as the removal of the protective water-cooled jacket.

Another method for avoiding deterioration of metal includes the use of an electrode or other refractory substrate made by alloying an iron/steel substrate with chromium. Still another well-known practice involves the use of nickelchromium alloys strengthened with oxides. However, the Applicant is unaware of any use of alloying chromium with molybdenum in order to avoid deterioration in the corrosive glass melting furnace environment.

Application of a protective coating to the electrode itself to ward off deterioration during start up has also been used to protect the electrodes. For example, a protective coating of molybdenum disilicide has been employed. However, the molybdenum disilicide coating has been found to provide only a few days of protection, whereas at least about one week of protection is required for glass melting furnace start up. In addition, corrosion protection of molybdenum using a $Cr_2O_3$ coating applied by plasma torch has been attempted. For example, the Kithany U.S. Pat. No. 4,668,262 discloses corrosion protection of molybdenum from oxidation by application of a dual coating of molybdenum disilicide and chromium oxide with molybdenum disilicide as the intermediate coat. One of the advantages of the intermediate coating is better adhesion of chromium oxide to the molybdenum substrate. However, the dual coatings especially molybdenum disilicide, are difficult and expensive to apply. In addition, due to various heat transfer considerations, it is difficult to apply more than about a 25 mil thickness of the chromium oxide coating.

Thus, there is a need for an improved way to protect refractory metal parts in a furnace for melting materials at high temperatures during the start up operation.

There is also a need for refractory metal substrates having a protective coating of at least about 25 mil thickness for use in a furnace for melting materials at high temperatures during the start up operation of the furnace.

STATEMENT OF INVENTION

There has now been provided a way to protect refractory metal materials during high temperature start up of a glass melting furnace. In one aspect the invention relates to coating of a refractory metal substrate with a plate or coating of chromium metal. The chromium coating is successful in protecting the refractory metal substrate from deterioration for a period of time sufficient for the start up operation of most glass melting furances. The refractory metal substrate can be used for electrodes in a glass melting furnace, a refractory metal wall, or a liner in a glass melting furnace. The refractory metal substrate can also be used as a part of a textile bushing, for the production of continuous filaments of glass, or a wool bushing. The coated refractory metal substrate of the invention is also useful for high-performance materials applications such as coatings on turbine blades. When used for applications not in contact with molten glass, the coating may protect the refractory metal substrate indefinitely.

In a preferred embodiment of the invention, the refractory metal substrate is suitable for use in contact with oxygen at a temperature greater than the oxidation acceleration temperature of the refractory metal substrate. The oxidation acceleration temperature is that temperature for the refractory metal, above which the rate of oxidation is so high that rapid deterioration of the refractory metal substrate occurs, assuming the refractory metal substrate is not protected from contact with oxygen. For example, the oxidation acceleration temperatures for various refractory metal substrates are as follows: molybdenum—about 1200° F.; tungsten—about 1200° F.; titanium—about 1000° F.; and, zirconium—about 900° F. These temperatures are the temperatures at which the metals will rapidly oxidize; however, it should be understood that these temperatures are much higher than the industry-recognized safe operating temperatures for such metals. For example, at high temperatures oxygen forms the oxides $MoO_2$ and $MoO_3$ on a molybdenum substrate. Above 932° F. the $MoO_3$ begins to volatilize and at 1110° F. the rate of evaporation becomes significant. At about 1450° F. the rate of evaporation equals its rate of formation and, as the temperature increases, the volatilization becomes extremely rapid. At 1750° F., the evaporation rate is about equal to the evaporation of water in dry air at 125° F.

In one aspect, the invention relates to a chromium plate or coating on a refractory metal substrate comprised of molybdenum.

In another aspect, the invention relates to a refractory metal substrate comprised of a chromium/molybdenum alloy having the following composition, by weight: chromium 10-20% approximately, alumina ($Al_2O_3$) 0-5% approximately, yttria ($Y_2O_3$) 0-1% approximately, titanium 0-0.5% approximately, zirconium 0-0.1% approximately, the balance being molybdenum.

In yet another aspect, the invention relates to a chromium plate or coating on the chromium/molybdenum alloy described above.

DESCRIPTION OF THE INVENTION

This invention will be described in terms of a furnace for melting glass, although it is to be understood that the invention can be practiced with other high temperature melting materials, such as rock, slag or basalt.

Figure 1:
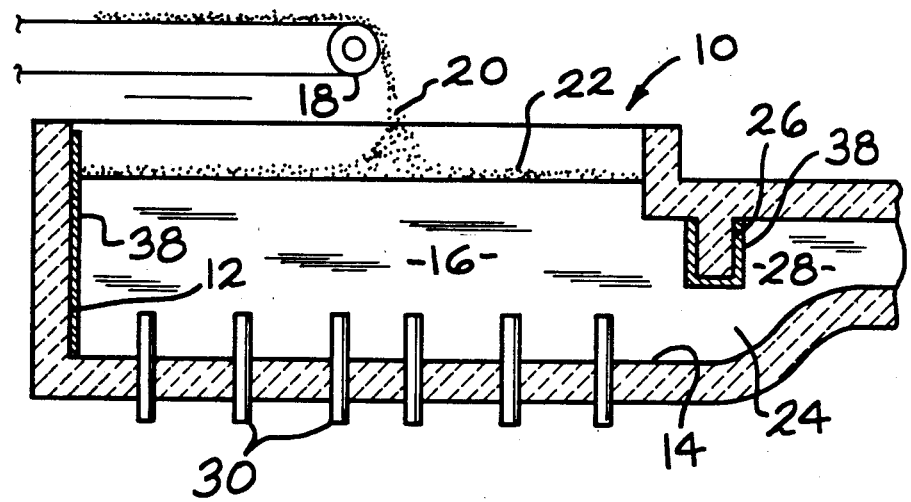
FIG. 1 is a schematic view in elevation of a glass melting furnace containing refractory metal substrate walls and electrodes coated according to this invention.

As shown in FIG. 1, the furnace 10 is comprised of furnace side walls 12 and a furnace bottom wall 14, which can be comprised of any suitable refractory materials, such as molybdenum, or the chromium/molybdenum alloy of the present invention. A body of molten glass 16 is contained in the furnace 10. A batch feeder 18 is positioned to deposit batch 20 onto the top of the molten glass 16. The batch 20 forms a batch blanket 22, which serves to insulate the molten glass 16 from the atmosphere. The molten glass 16 exits the furnace 10 through a throat 24 which is defined by a skimmer block 26. The molten glass 16 then passes through a channel 28 to any suitable receptacle for the molten glass, such as a forehearth supplying bushings for the production of glass fibers, not shown.

The glass is kept in a molten state, and the batch in the blanket is melted, by the heat supplied from Joule effect heating from the electric current passing between electrodes 30. The electrodes can be inserted through the furnace bottom wall 14, as shown, and/or can be positioned in the furnace side walls 12.

In one embodiment of the invention, various components of the furnace, such as, for example the electrodes, furnace side walls and/or bottom walls or a motionless mixer (not shown) are made of the chromium/molybdenum alloy refractory material of the present invention. This chromium/molybdenum alloy comprises, by weight, from about 10-20% chromium, from about 0-5% alumina ($Al_2O_3$), from about 0-1% yttria ($Y_2O_3$), from about 0-0.5% titanium, from about 0-0.1% zirconium, and the balance being molybdenum.

Chromium is used in the high temperature alloy of the present invention since, on oxidation, it converts to chromium oxide which forms a protective layer and prevents further oxidation. Chromium is useful in the range of approximately 10-20% since above this range (i.e. greater than about 20%) chromium makes the alloy too brittle for use as a furnace component. Below about 10%, chromium is not as useful in providing oxidation resistance properties.

The alumina ($Al_2O_3$) and yttria ($Y_2O_3$) oxide dispersoids lie on the surface of the alloy and act as oxide nucleation sites, leading to a reduction in the time required to form a continuous $Cr_2O_3$ scale. The dispersoids also improve scale adhesion. Some other desirable effects include increased porosity or small grain size in oxide scale which aids in thermally induced expansion and contraction.

Titanium and zirconium improve the strength of the alloy considerably over the unalloyed molybdenum at temperatures above 2000° F.

The ingredients of the chromium/molybdenum alloy are started in the form of powders. These powders are mixed in proportions mentioned above. The preferred composition is made into desired parts/shapes by known powder metallurgy techniques such as H.I.P. (Hot Isostatic Press) or cold compaction methods. After pressing and sintering, the ingots are worked by forging, rolling, swaging and rolling into various mill products. The mechanical processing steps which are based on the desired properties of the alloy, are known to those skilled in the art. It is within the contemplated scope of this invention that the chromium/molybdenum alloy refractory metal substrate can also contain a plate or coating of chromium metal.

According to another embodiment of this invention, the various components of the furnace are comprised of molybdenum and are coated with a chromium metal or fitted with a liner 38 of molybdenum coated with a chromium metal coating. In addition, the liner 38 can be fitted to other exposed parts of glass melting equipment such as the forehearth, the throat, skimmer block and channel (not shown). These parts will be protected from deterioration at elevated temperatures during the start up operation of the furnace when they are exposed to the furnace start up environment. In one embodiment a molybdenum substrate is coated with chromium metal. Preferably, the coating of chromium metal is applied to the refractory metal substrate in a thickness within the range of from about 0.5 mil. to about 25 mil. The chromium metal coating can be applied by any suitable technique, similar to the hot dip galvanizing technique known to those skilled in the art, but using chromium instead of zinc.

By coating chromium on the refractory metal substrate the chromium metal atoms penetrate deeper into the refractory metal substrate than when the substrate is coated with a chromium oxide. Phase diagrams (not shown) of Cr-Mo indicate that it is possible to achieve up to about 50% solid solution of chromium in a substrate containing molybdenum.

After the chromium metal coating is applied to the refractory metal substrate and the refractory metal substrate is exposed to the high temperature environment of either hot air or nitrogen gas, the chromium metal will either be oxidized or nitrided. A protective scale or layer of either a chromium oxide or chromium nitride, depending on the environment, forms on the refractory metal substrate. This protective layer lengthens the time the furnace component can be used before the refractory metal substrate itself is either oxidized or nitrided.

During operation of the furnace, the chromium metal coating may wear out once the coated refractory metal substrate is exposed to glass for longer than about one to two weeks, thereby exposing the substrate itself. However, by this time the substrate is immersed in the molten glass and subsequent corrosion of the electrode by oxidation or nitridation is minimal.

Figure 2:
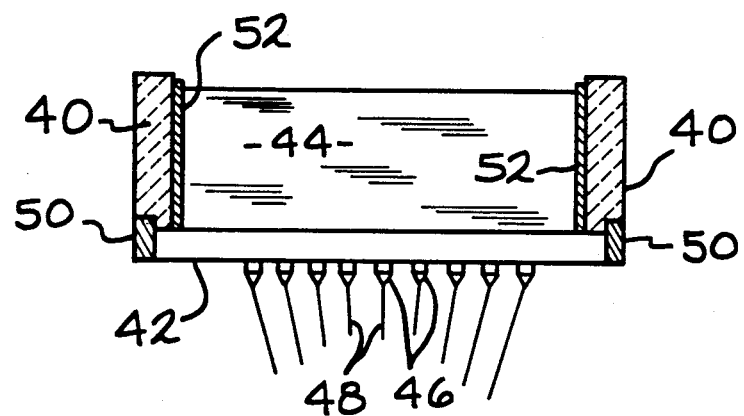
FIG. 2 is a schematic view in elevation of a textile bushing for the manufacture of glass fibers according to the principles of this invention.

The coated refractory metal substrate can also be employed in a textile bushing for producing glass fibers, as can be seen in FIG. 2. The textile bushing is comprised of refractory material walls 40 and bushing bottom wall 42 which contains molten glass mass 44. The bushing bottom wall 42 is adapted with a plurality of tips 46 through which molten glass passes to form glass fibers 48. The bushing bottom wall 42 can be electrically heated by the application of an appropriate voltage across terminals 50. The invention can be applied to the textile bushing as follows: the refractory walls (or bushing bottom wall) can be adapted with a chromium metal liner, such as liner 52, to protect the body of molten glass from contamination caused by deterioration of the refractory material. Alternatively, the refractory walls (or bushing bottom wall) can be comprised of the chromium/molybdenum alloy of the present invention in the ranges described above.

It will be evident from the foregoing that various modifications can be made to this invention. Such however are considered to be within the scope of this invention.

I claim:

1. A coated refractory metal substrate suitable for use in contact with an oxygen- or nitrogen-containing environment at a temperature greater than the oxidation or nitridation acceleration temperature of the substrate, comprising a refractory metal substrate comprising, by weight percent: from about 10 to about 20 chromium, from about 0 to about 5 alumina ($Al_2O_3$), from about 0 to about 1 yttria ($Y_2O_3$), from about 0 to about 0.5 titanium, from about 0 to about 0.1 zirconium, the balance being essentially molybdenum to make 100% of the refractory metal substrate, and having a coating comprised of chromium metal, wherein the chromium metal coating has a thickness within the range of from about 0.5 mil. to about 25 mil.

2. An electrode for a glass melting furnace suitable for use in contact with an oxygen- or nitrogen-containing environment at a temperature greater than the oxidation or nitridation acceleration temperature of the substrate, comprising a refractory metal substrate which comprises, by weight percent: from about 10 to about 20 chromium, from about 0 to about 5 alumina ($Al_2O_3$), from about 0 to about 1 yttria ($Y_2O_3$), from about 0 to about 0.5 titanium, from about 0 to about 0.1 zirconium, the balance being essentially molybdenum to make 100% of the refractory metal substrate, and a coating comprised of chromium metal, wherein the chromium metal coating has a thickness within the range of about 0.5 mil. to about 25.0 mil.

3. A liner in a glass melting furnace suitable for use in contact with an oxygen- or nitrogen-containing environment at a temperature greater than the oxidation or nitridation acceleration temperature of the substrate, comprising a refractory metal substrate which comprises, by weight percent: from about 10 to about 20 chromium, from about 0 to about 5 alumina ($Al_2O_3$), from about 0 to about 1 yttria ($Y_2O_3$), from about 0 to about 0.5 titanium, from about 0 to about 0.1 zirconium, the balance being essentially molybdenum to make 100% of the refractory metal substrate, and a coating comprised of chromium metal, wherein the chromium metal coating has a thickness within the range of about 0.5 mil. to about 25.0 mil.

4. A textile bushing for use in making glass fibers suitable for use in contact with an oxygen- or nitrogen-containing environment at a temperature greater than the oxidation or nitridation acceleration temperature of the substrate, comprising a refractory metal substrate which comprises, by weight percent: from about 10 to about 20 chromium, from, about 0 to about 5 alumina ($Al_2O_3$), from about 0 to about 1 yttria ($Y_2O_3$), from about 0 to about 0.5 titanium, from about 0 to about 0.1 zirconium, the balance being essentially molybdenum to make 100% of the refractory metal substrate, and a coating comprised of chromium metal, wherein the chromium metal coating has a thickness within the range of about 0.5 mil. to about 25.0 mil.

* * * * *